United States Patent
Abraham et al.

(10) Patent No.: US 8,494,031 B2
(45) Date of Patent: Jul. 23, 2013

(54) PROTOCOL OPERATION AND MESSAGE DESIGN FOR SDMA DATA TRANSMISSION TO A PLURALITY OF STATIONS

(75) Inventors: Santosh P. Abraham, San Diego, CA (US); Vinay Sridhara, Santa Clara, CA (US); Hemanth Sampath, San Diego, CA (US); Sameer Vermani, San Diego, CA (US); Vincent Knowles Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 998 days.

(21) Appl. No.: 12/493,719

(22) Filed: Jun. 29, 2009

(65) Prior Publication Data

US 2010/0220813 A1 Sep. 2, 2010

Related U.S. Application Data (60) Provisional application No. 61/156,387, filed on Feb. 27, 2009.

(51) Int. Cl.
*H04B 1/38* (2006.01)
*H04L 5/16* (2006.01)

(52) U.S. Cl.
USPC ............................... 375/219; 455/73; 713/1

(58) Field of Classification Search
USPC ........................................................ 375/219
See application file for complete search history.

(56) References Cited

U.S. PATENT DOCUMENTS

| | | | |
|---|---|---|---|
| 8,059,609 B2 * | 11/2011 | Kim et al. ...................... | 370/334 |
| 2005/0111599 A1 | 5/2005 | Walton et al. | |
| 2005/0147023 A1 | 7/2005 | Stephens et al. | |
| 2005/0249303 A1 | 11/2005 | Takano | |
| 2006/0023803 A1 | 2/2006 | Perlman et al. | |
| 2006/0248429 A1 | 11/2006 | Grandhi et al. | |
| 2007/0129018 A1 | 6/2007 | Trainin et al. | |
| 2007/0153731 A1 * | 7/2007 | Fine .............................. | 370/329 |
| 2007/0211815 A1 * | 9/2007 | Pan et al. ...................... | 375/267 |
| 2007/0223422 A1 * | 9/2007 | Kim et al. ..................... | 370/334 |
| 2007/0258541 A1 | 11/2007 | Yamaura | |
| 2008/0062867 A1 * | 3/2008 | Lee et al. ...................... | 370/230 |
| 2008/0311939 A1 * | 12/2008 | Hugl et al. .................... | 455/507 |
| 2009/0143008 A1 * | 6/2009 | Hottinen et al. ............. | 455/11.1 |
| 2009/0168911 A1 * | 7/2009 | Park et al. .................... | 375/260 |

(Continued)

FOREIGN PATENT DOCUMENTS

| | | |
|---|---|---|
| EP | 2129004 A1 | 12/2009 |
| JP | 2005323218 A | 11/2005 |

(Continued)

OTHER PUBLICATIONS

International Search Report and Written Opinion—PCT/US2010/025667—International Search Authority, European Patent Office,Dec. 6, 2010.

(Continued)

*Primary Examiner* — Erin M. File
(74) *Attorney, Agent, or Firm* — Steven R. Thiel (57) ABSTRACT

An apparatus including a processing system configured to construct a coding matrix from channel state information and encode a plurality of spatial streams with the coding matrix for transmission to one or more nodes. A method for performing the process is also disclosed herein.

57 Claims, 10 Drawing Sheets

U.S. PATENT DOCUMENTS

| | | | |
|---|---|---|---|
| 2010/0035555 A1* | 2/2010 | Bala et al. .................... | 455/63.1 |
| 2010/0091892 A1* | 4/2010 | Gorokhov .................... | 375/260 |
| 2010/0104033 A1* | 4/2010 | Gorokhov .................... | 375/260 |
| 2010/0173659 A1* | 7/2010 | Shin et al. .................... | 455/500 |
| 2011/0216733 A1* | 9/2011 | Han et al. .................... | 370/329 |
| 2012/0113816 A1* | 5/2012 | Bhattad et al. ................ | 370/246 |
| 2012/0127899 A1* | 5/2012 | Ketchum et al. ............. | 370/310 |
| 2013/0084884 A1* | 4/2013 | Teyeb et al. ................ | 455/456.1 |

FOREIGN PATENT DOCUMENTS

| | | |
|---|---|---|
| JP | 2006081162 A | 3/2006 |
| JP | 2007318730 A | 12/2007 |
| JP | 2008535380 A | 8/2008 |
| WO | WO2005015844 | 2/2005 |
| WO | 2006107538 A2 | 10/2006 |
| WO | 2006107886 A2 | 10/2006 |
| WO | 2007094633 A1 | 8/2007 |
| WO | 2007117949 A1 | 10/2007 |
| WO | WO2008002972 | 1/2008 |
| WO | WO2008113281 | 9/2008 |
| WO | WO2009142806 | 11/2009 |

OTHER PUBLICATIONS

Partial International Search Report—PCT/US2010/025667—International Search Authority, European Patent Office, Oct. 14, 2010.

Shirasu M et al., "A MAC Protocol for Maximum Allocation of Transmitted Streams after Receiving Multiple RTSs in MIMO Ad Hoc Networks," Technical Report of the Institute of Electronics, Information and Communication Engineers, Oct. 12, 2006, vol. 106, No. 304, pp. 1-6, CS2006-36.

Taiwan Search Report—TW099105930—TIPO—Mar. 17, 2013.

Zhou S. et al., "An Uplink Medium Access Protocol with SDMA Support for Multiple-Antenna WLANs" Wireless Communications and Networking Conference, 2008. WCNC 2008. IEEE, IEEE, Piscataway, NJ, USA, Mar. 31, 2008, pp. 1809-1814, XP031243907.

\* cited by examiner

PROTOCOL OPERATION AND MESSAGE DESIGN FOR SDMA DATA TRANSMISSION TO A PLURALITY OF STATIONS

CROSS-REFERENCE TO RELATED APPLICATIONS

Claim of Priority Under 35 U.S.C. §119

The present Application for Patent claims priority to Provisional Application No. 61/156,387, entitled "Protocol Operation and Message Design for SDMA Data Transmission to a Plurality of Stations" filed Feb. 27, 2009, and assigned to the assignee hereof and hereby expressly incorporated by reference herein.

BACKGROUND

I. Field

The following description relates generally to communication systems, and more particularly to an SDMA operation and message system for a plurality of stations.

II. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

In communication systems, medium access (MAC) protocols are designed to operate to exploit several degrees of freedom offered by the air link medium. The most commonly exploited degrees of freedom are time and frequency. For example, in the IEEE 802.11 MAC protocol, the "time" degree of freedom is exploited through the CSMA (Carrier Sense Multiple Access). The CSMA protocol attempts to ensure that no more than one transmission occurs in a neighborhood of potential high interference. The "frequency" degree of freedom can be exploited by using different channels.

Recent developments have led to space dimension being a viable option. Spatial Division Multiple Access (SDMA) can be used for improving utilization of the air link by scheduling multiple terminals for simultaneous transmission and reception. Data is sent to each of the terminals using spatial streams. For example, with Spatial Division Multiple Access (SDMA) a transmitter forms orthogonal streams to individual receivers. Such orthogonal streams can be formed because the transmitter has several antennas and the transmit/receive channel consists of several paths. The receivers may also have one or more antennas (MIMO, SIMO). For this example, it is assumed that the transmitter is an access point (AP) and the receivers are stations (STAs). The streams are formed such that a stream targeted at STA-B, for example, is seen as low power interference at STA-C, STA-D, . . . , etc., which will not cause significant interference and not be ignored. In order to form the orthogonal streams, the AP needs to have the channel state information (CSI) from each of the receiving STAs. The channel state information can be measured and communicated in several ways. The use of CSI will facilitate the configuration of the SDMA streams.

Consequently, it would be desirable to address one or more of the deficiencies described above.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to systems and/or methods that provide wireless communications, where an apparatus for wireless communications includes a processing system configured to construct a coding matrix from channel state information; encode a plurality of data streams with the coding matrix; and transmitting the encoded data streams to one or more nodes.

In another aspect, an apparatus for wireless communications is provided that includes means for constructing a coding matrix from channel state information; means for encoding a plurality of data streams with the coding matrix; and means for transmitting the encoded data streams to one or more nodes.

In yet another aspect, a method for wireless communications is provided that includes constructing a coding matrix from channel state information; encoding a plurality of data streams with the coding matrix; and transmitting the encoded data streams to one or more nodes.

In yet another aspect, a computer-program product for communication is provided that includes a machine-readable medium encoded with instructions executable to construct a coding matrix from channel state information; encode a plurality of data streams with the coding matrix; and transmit the encoded data streams to one or more nodes.

In yet another aspect, an access point is provided that includes one or more antennas; a processing system configured to construct a coding matrix from channel state information; encode a plurality of data streams with the coding matrix; and a transmitter configured to transmit, via the one or more antennas, the encoded spatial streams through the antennas to one or more nodes.

In yet another aspect, an electronic card is provided that includes a processing system configured to construct a coding matrix from channel state information and encode a plurality of spatial streams with the coding matrix; and a transmitter configured to transmit the encoded spatial streams through a plurality of antennas.

In yet another aspect, an apparatus for wireless communications is provided that includes a processing system configured to receive a TRM comprising a list of requested respondents; generate a response based on the TRM, wherein the response comprises an identification of the apparatus as a respondent in the list of requested respondents; and transmit the response.

In yet another aspect, an apparatus for wireless communications is provided that includes means for receiving a TRM comprising a list of requested respondents;

means for generating a response based on the TRM, wherein the response comprises an identification of the apparatus as a respondent in the list of requested respondents; and means for transmitting the response.

In yet another aspect, a method for wireless communications is provided that includes receiving a TRM comprising a list of requested respondents; generating a response based on the TRM, wherein the response comprises an identification of a respondent in the list of requested respondents; and transmitting the response.

In yet another aspect, a computer-program product for communication is provided that comprises a machine-readable medium comprising instructions executable to receive a TRM comprising a list of requested respondents; generate a response based on the TRM, wherein the response comprises an identification of a respondent in the list of requested respondents; and transmit the response.

In yet another aspect, an access terminal is provided that comprises an antenna; a receiver configured to receive, via the antenna, a TRM comprising a list of requested respondents; a processing system configured to generate a response based on the TRM, wherein the response comprises an identification of the apparatus as a respondent in the list of requested respondents; and a transmitter configured to transmit the response.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Figure 1:
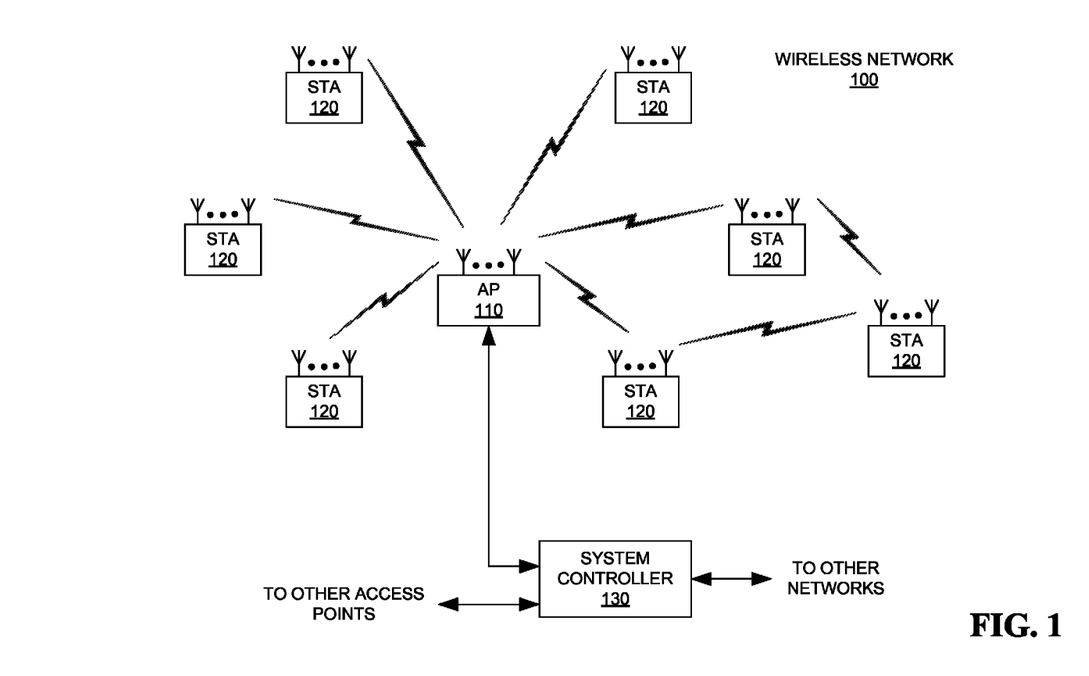
FIG. 1 is a diagram of a wireless communications network configured in accordance with an aspect of the disclosure.

Several aspects of a wireless network will now be presented with reference to FIG. 1. The wireless network, which is also referred to herein as a basic service set (BSS) 100 is shown with several wireless nodes, generally designated as an access point 110 and a plurality of access terminals or stations (STAs) 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using Spatial Division Multiple Access (SDMA). SDMA is a multiple access scheme which enables multiple streams transmitted to different receivers at the same time to share the same frequency channel and, as a result, provide higher user capacity. This is achieved by spatially preceding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream. It should be noted that although the term "preceding" is used herein, in general, the term "coding" may also be used to encompass the process of preceding, encoding, decoding and/or postcoding a data stream.

One or more access terminals 120 may be equipped with multiple antennas to enable certain functionality. With this configuration, for example, multiple antennas at the access point 110 may be used to communicate with a multiple antenna access terminal to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

Figure 2:
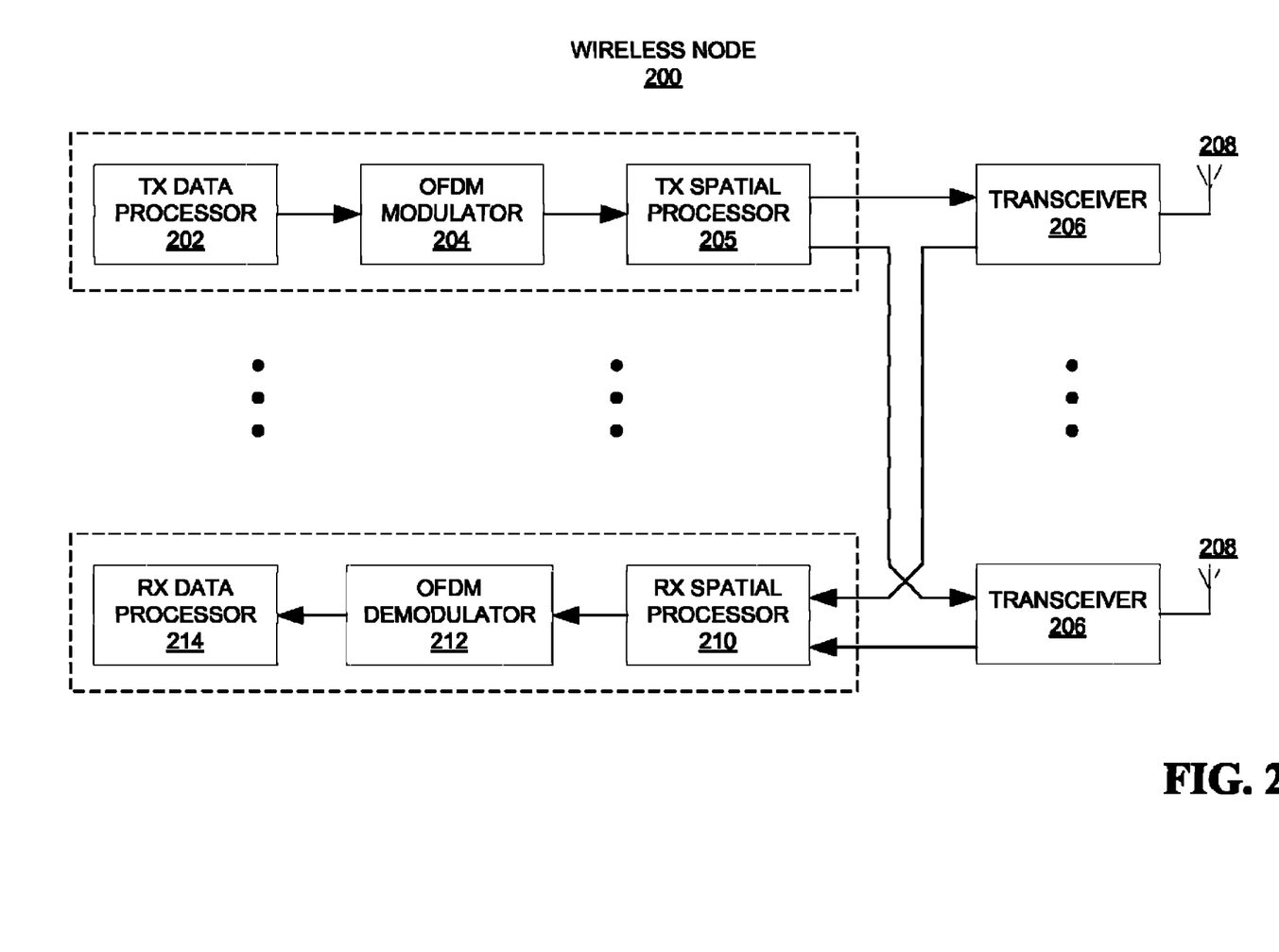
FIG. 2 is a wireless node that includes a front end processing system in a wireless node in the wireless communications network of FIG. 1.

FIG. 2 is a conceptual block diagram illustrating an example of the signal processing functions of the PHY layer. In a transmit mode, a TX data processor 202 may be used to receive data from the MAC layer and encode (e.g., Turbo code) the data to facilitate forward error correction (FEC) at the receiving node. The encoding process results in a sequence of code symbols that that may be blocked together and mapped to a signal constellation by the TX data processor 202 to produce a sequence of modulation symbols.

As discussed herein, various aspects of the system and approaches described herein may be implemented in a wireless network supporting MIMO technology. Using MIMO technology, an access point may communicate with multiple STAs simultaneously using SDMA. SDMA is a multiple access scheme which enables multiple streams transmitted to different receivers at the same time to share the same frequency channel and, as a result, provide higher user capacity. This is achieved by spatially preceding each data stream and then transmitting each spatially precoded stream through a different transmit antenna on the downlink. The spatially precoded data streams arrive at the STAs with different spatial signatures, which enable each STA to recover the data stream destined for that STA. On the uplink, each STA transmits a spatially precoded data stream, which enables the access point to identify the source of each spatially precoded data stream.

In wireless nodes implementing OFDM, the modulation symbols from the TX data processor 202 may be provided to an OFDM modulator 204. The OFDM modulator 204 splits the modulation symbols into parallel streams. Each stream is then mapped to an OFDM subcarrier and then combined using an Inverse Fast Fourier Transform (IFFT) to produce a time domain OFDM stream.

A TX spatial processor 205 performs spatial processing on the OFDM stream. This may be accomplished by spatially precoding each OFDM stream and then providing each spatially precoded stream to a different antenna 208 via a transceiver 206. Each transceiver 206 modulates an RF carrier with a respective precoded stream for transmission over the wireless channel.

In a receive mode, each transceiver 206 receives a signal through its respective antenna 208. Each transceiver 206 may be used to recover the information modulated onto an RF carrier and provide the information to a RX spatial processor 210.

The RX spatial processor 210 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 200, they may be combined by the RX spatial processor 210.

In wireless nodes implementing OFDM, the stream (or combined stream) from the RX spatial processor 210 is provided to an OFDM demodulator 212. The OFDM demodulator 212 converts the stream (or combined stream) from time-domain to the frequency domain using a Fast Fourier Transform (FFT). The frequency domain signal comprises a separate stream for each subcarrier of the OFDM signal. The OFDM demodulator 212 recovers the data (i.e., modulation symbols) carried on each subcarrier and multiplexes the data into a stream of modulation symbols.

A RX data processor 214 may be used to translate the modulation symbols back to the correct point in the signal constellation. Because of noise and other disturbances in the wireless channel, the modulation symbols may not correspond to an exact location of a point in the original signal constellation. The RX data processor 214 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 214 then uses the sequence of code symbol LLRs in order to decode the data that was originally transmitted before providing the data to the MAC layer.

The SDMA downlink protocol may include the following steps
  (1) Requesting and receiving channel state information (CSI) from all the potential SDMA receivers;
  (2) Downlink SDMA packet construction and transmission, and Block Acknowledgement (ACK) transmission time specification; and
  (3) Block ACK transmission by the SDMA transmission recipient stations (STAs) and Method for CSI estimation.

Obtaining accurate channel state information is a valuable part of the SDMA protocol as spatial streams are formed such that a stream targeted at a particular STA, for example, are seen as low power interference at other STAs. In order to form these non interfering streams, the transmitting node needs to have the CSI from each of the receiving STAs. In one aspect, the transmitting node sends out a request message indicating that the CSI needs to be estimated. The request message is sent to a set of STAs that are potential SDMA transmission recipients. This message is referred to as a Training Request Message (TRM). In the disclosure contained herein, two examples for obtaining CSI at an SDMA transmitter are provided: implicit CSI exchange and explicit CSI exchange.

Figure 3:
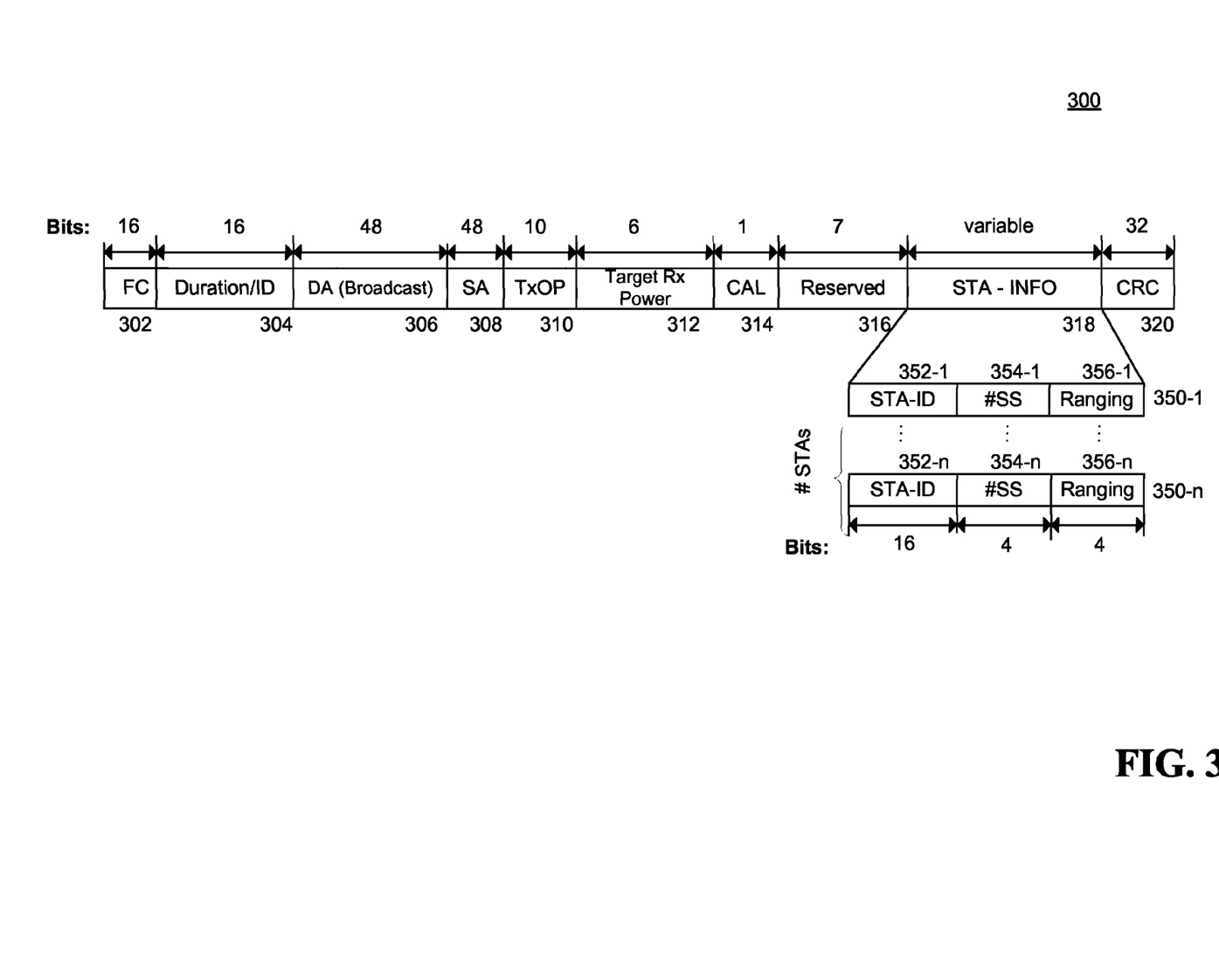
FIG. 3 is a diagram of a TRM frame configured in accordance with one aspect of the disclosure.

An example of the format of the TRM is shown by a TRM 300 in FIG. 3. The data portion of the TRM 300 contains a STA information field 318 that includes the following information:
  (1) STA-ID field 352: Lists the STAs 120 for which the CSI is to be estimated;
  (2) # SS field 354: The number of spatial streams for each STA 120; and
  (3) Ranging information field 356: Ensure that the sounding symbols arrive time aligned at the AP 110 to ensure accurate joint channel estimate.

The TRM 300 also contains a target Rx Power field 312, which is the Rx power at which an STA's sounding frame should be received at the AP 110. In addition, the TRM 300 also includes a calibration bit 314 that is used for an integrated downlink calibration procedure. Calibration is invoked at relatively large intervals to enable to AP 110 to update correction factors to be applied to the channel estimates.

In one aspect of the disclosure, each TRM such as the TRM 300 is transmitted at a fixed transmit power since the STAs 120 use the transmit power of the TRM to estimate path loss and set transmit power for the uplink sounding frame. The TRM 300 contains the legacy MAC header with the destination address set to the broadcast address in a DA (Broadcast) field 306. The destination address could also be set to a predefined multicast address. The transmission of each TRM is performed using backoff procedures, and in one aspect, the transmission may be performed using the procedures defined in the IEEE 802.11 MAC protocols for contention-based access.

A Duration/ID field 304 in the MAC header is set such that the entire SDMA transmission and the Block ACK reception are accounted for in the distance. In one aspect of the disclosure, each TRM such as the TRM 300 is transmitted at the lowest legacy 802.11a/g rate so the all the STAs 120 in the wireless network 100 can set their NAV appropriately.

Once each of the STAs 120 that are listed in the TRM 300 receives the TRM 300, they each respond with the CSI. In various aspects of the disclosure, multiple approaches may be used to provide an estimate of CSI after a TRM has been transmitted by the SDMA transmitter.

Figure 4:
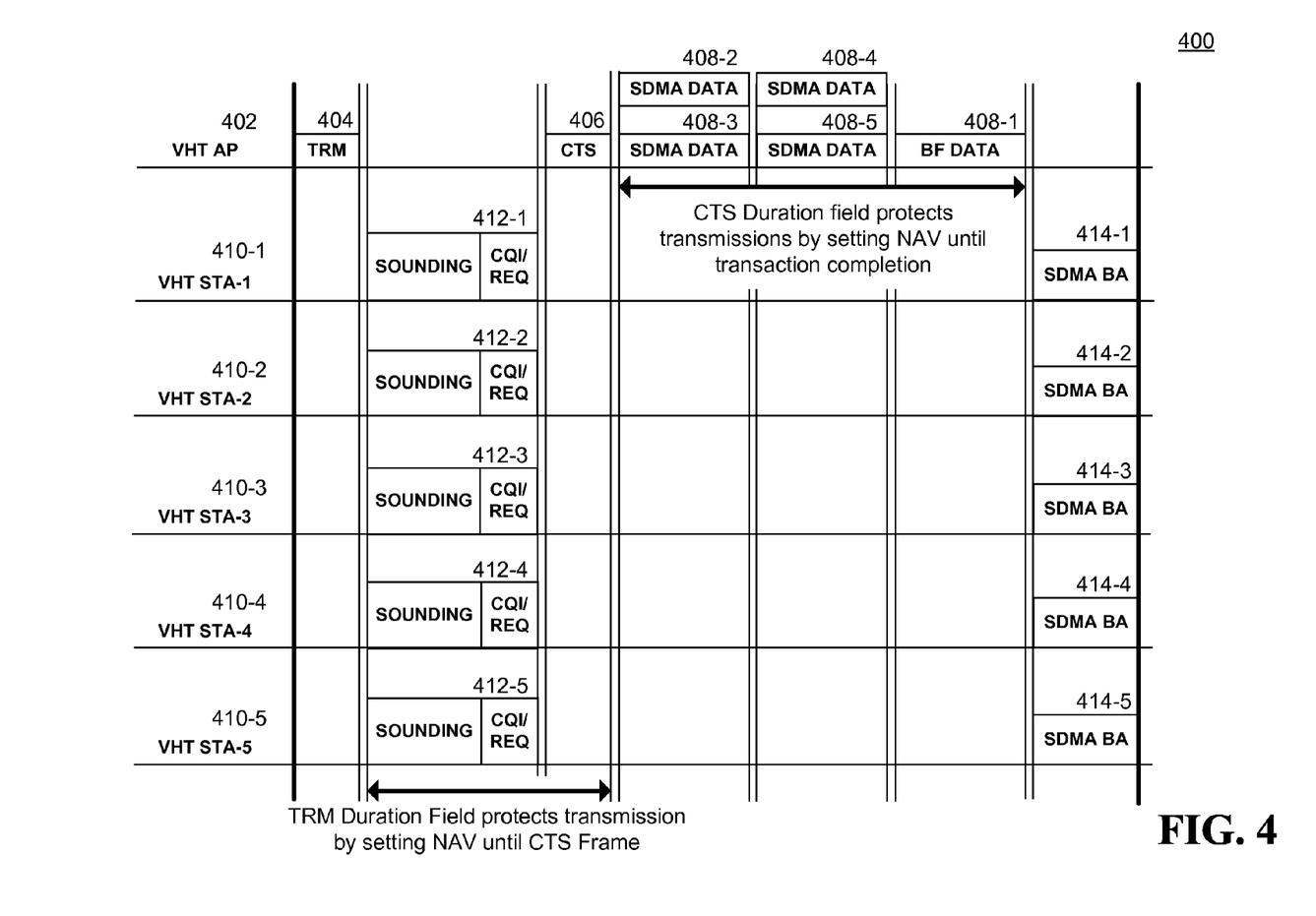
FIG. 4 is a timing diagram illustrating the operation of an SDMA protocol with implicit feedback based on the TRM frame format of FIG. 3.

In one approach, an implicit CSI feedback process is implemented, where each of the STAs 120 listed in the TRM 300 sends a sounding frame in response receiving the TRM. The SDMA transmitter estimates the joint channel to the desired STAs from the received sounding frames. In this case, it is assumed that the channel is reversible and that calibration is necessary. An example of this approach is depicted in FIG. 4, where a plurality of STAs 410-1 to 410-5 sends respective sounding frame 412-1 to 412-5 in response to a TRM 404 transmitted from an VHT AP 402. Then, once a clear to send (CTS) 406 has been sent by the VHT AP 402 to protect the transmission of SDMA data 408-1 to 408-5 to each of the plurality of STAs 410-1 to 410-5, respectively, the plurality of STAs 410-1 to 410-5 can then each send respective block acknowledgements 414-1 to 414-5.

Figure 5:
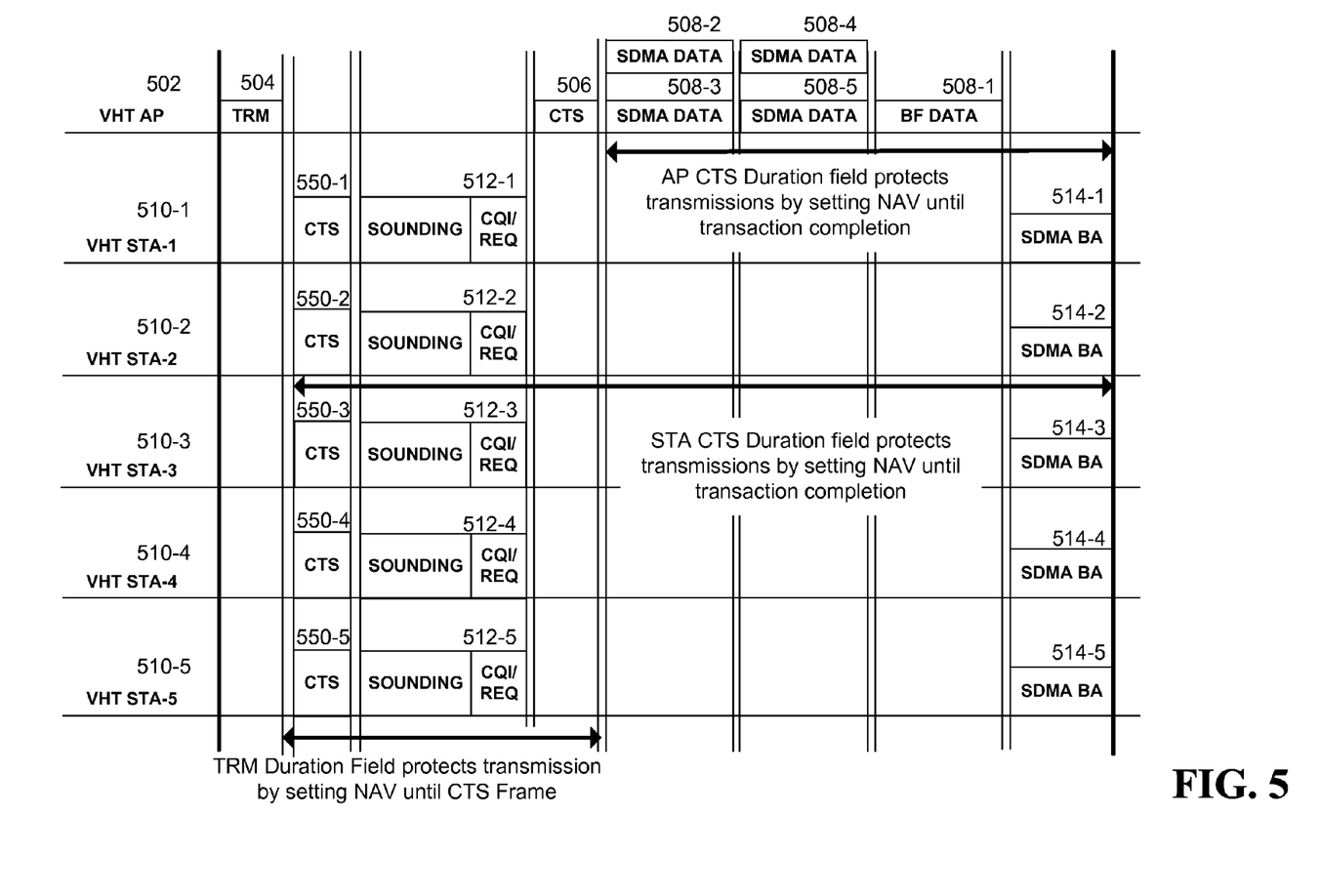
FIG. 5 is a timing diagram illustrating the operation of an SDMA protocol with implicit feedback based on the TRM frame format of FIG. 3 that includes a simultaneous transmission of a plurality of clear to send (CTS) transmissions.

In other aspects, a separate CTS transmission is performed prior to the transmission of the sounding frame to enhance the protection of individual stations. There are two separate approaches. Referring to FIG. 5, a plurality of CTSs 550-1 to 550-5 are used to enhance the protection of a plurality of sounding transmissions 512-1 to 512-5 transmitted from a plurality of STAs 510-1 to 510-5 in response to a TRM 504 transmitted from an VHT AP 502. As illustrated, the plurality of CTSs 550-1 to 550-5 are transmitted simultaneously before the plurality of sounding transmissions 512-1 to 512-5 are sent. Once a clear to send (CTS) 506 has been sent by the VHT AP 502 to protect the transmission of SDMA data 508-1 to 508-5 to each of the plurality of STAs 510-1 to 510-5, respectively, the plurality of STAs 510-1 to 510-5 can then each send respective block acknowledgements 514-1 to 514-5.

Figure 6:
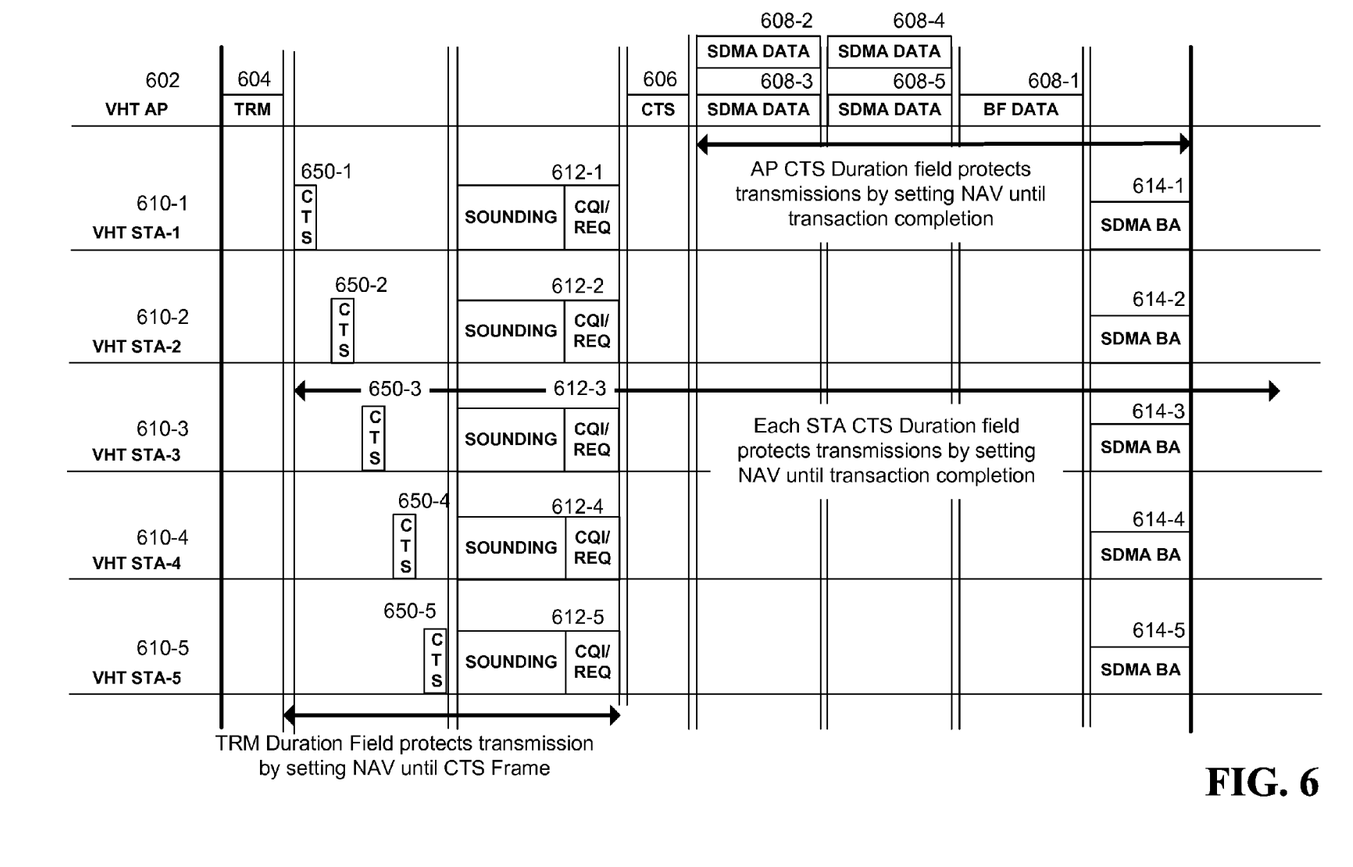
FIG. 6 is a timing diagram illustrating the operation of an SDMA protocol with implicit feedback based on the TRM frame format of FIG. 3 that includes a sequential transmission of a plurality of clear to send (CTS) transmissions.

Referring to FIG. 6, a plurality of CTSs 650-1 to 650-5 are used to enhance the protection of a plurality of sounding transmissions 612-1 to 612-5 transmitted from a plurality of STAs 610-1 to 610-5 in response to a TRM 604 transmitted from an VHT AP 602. As illustrated, the plurality of CTSs 650-1 to 650-5 are transmitted serially before the plurality of sounding transmissions 612-1 to 612-5 are transmitted. Then, once a CTS 606 has been transmitted by the VHT AP 602 to protect the transmission of SDMA data 608-1 to 608-5 to each of the plurality of STAs 610-1 to 610-5, respectively, the plurality of STAs 610-1 to 610-5 can then each send respective block acknowledgements 614-1 to 614-5.

Figure 7:
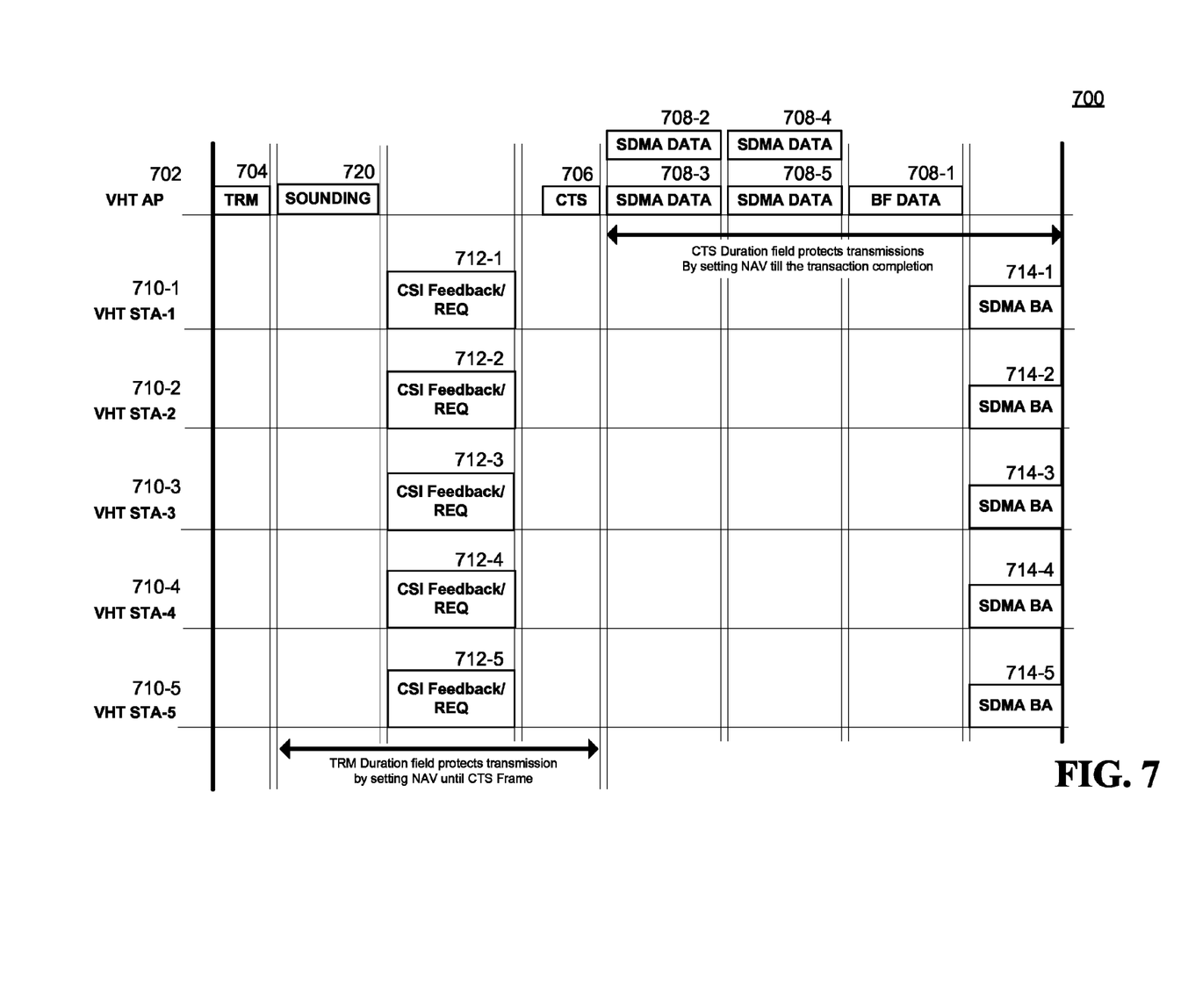
FIG. 7 is a timing diagram illustrating the operation of the SDMA protocol with explicit CSI feedback based on the TRM frame format of FIG. 3.

In another approach, as depicted in FIG. 7, an explicit CSI feedback process is implemented where, initially, an SDMA-capable transmitter such as an AP 702 sends a sounding frame 720 followed by a TRM 704 such as the TRM 300. Each receiver that is identified by a list of STAs contained in the TRM 704 will compute the channel using the sounding frame 720 and then sends the CSI back to the TRM transmitter (i.e., the SDMA-capable transmitter of AP 702) in the data frame. The plurality of STAs are illustrated as STAs 710-1 to 710-5 and the plurality of CSI feedbacks are illustrated as CSI feedbacks 712-1 to 712-5. A CTS frame 706 is also used to protect the transmission of SDMA data 708-1 to 708-5 to each of the plurality of STAs 710-1 to 710-5, respectively. In one aspect of the disclosure, sounding frames such as the sounding frame 720 are not included as a part of any TRM in order to preserve co-existence with legacy systems.

Figure 8:
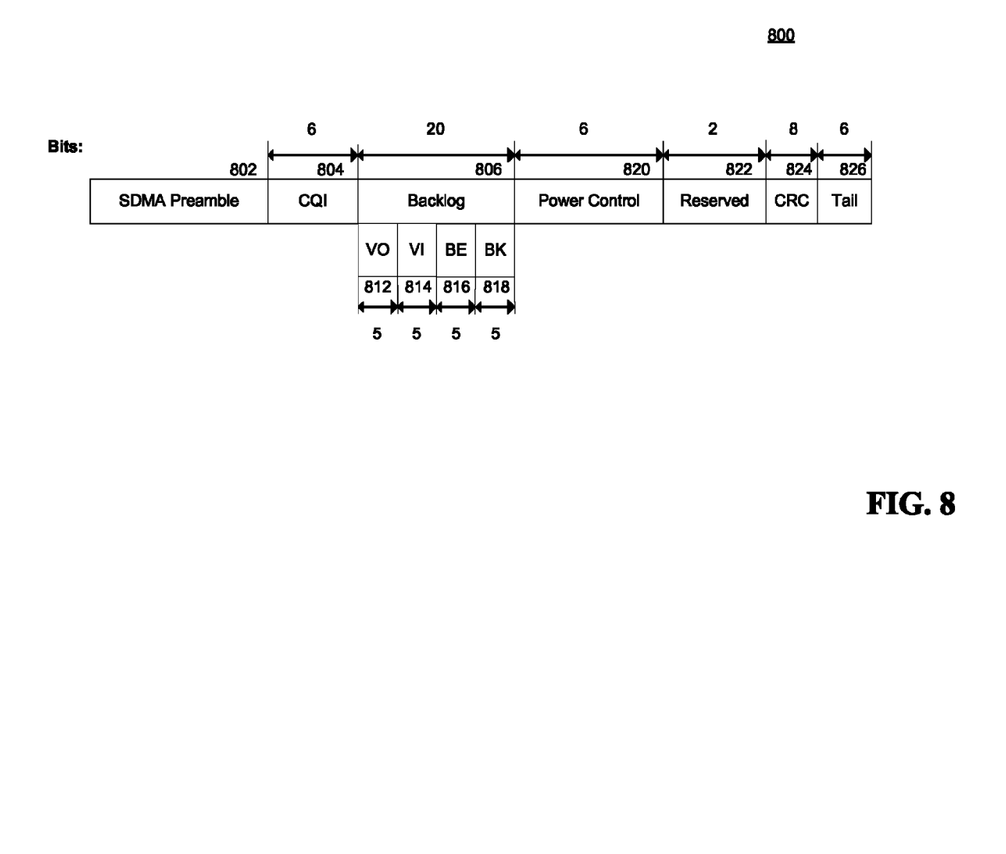
FIG. 8 is a diagram of a sounding frame that includes an SDMA preamble and control information determined by the spatial stream allocation based on the information contained in the TRM frame of FIG. 3.

FIG. 8 illustrates a sounding frame 800 that includes an SDMA preamble portion 802 and a control information portion 804-826. In one aspect of the disclosure, the length of the SDMA preamble portion 802 is determined by the spatial stream allocation specified in the TRM 300. The control information portion 804-826 provides the following information:
  (1) Channel Quality Indicator (CQI) field 804: The CQI field 804 contains the per-antenna received SNR averaged across all Rx antennas and tones for a received TRM. This information allows the SDMA transmitter to construct a precoding matrix, if the matrix construction design is based on the MMSE criterion. The information contained in the CQI field 804 also enables the SDMA transmitter to estimate the post detection signal to interference/noise ratio (SINR) and assign appropriate transmission rates for each responding STAs. In one aspect of the disclosure, the CQI can be measured by measuring a level of ambient noise surrounding the receiver during a quiet period;

(2) Uplink Traffic Backlog field 806: The information contained in the Uplink Traffic Backlog field 806 enables an SDMA transmitter to schedule uplink traffic epochs and/or assign reverse direction grants (RDG). The information contained in the Uplink Traffic Backlog field 806 also facilitates the scheduler creating a tight schedule, thereby optimizing performance of the MAC protocol. In one aspect, the uplink traffic backlog is presented on a per class basis, and VO (voice), VI (video), BE (best effort), and BK (background) fields 812-818 denote four example priority classes; and (3) Power Control field 820: The transmit power information contained in the power control field 820 is filled in by an STA as described herein.

A CRC field 824 for error correction, and a tail field 826 is also included.

Figure 9:
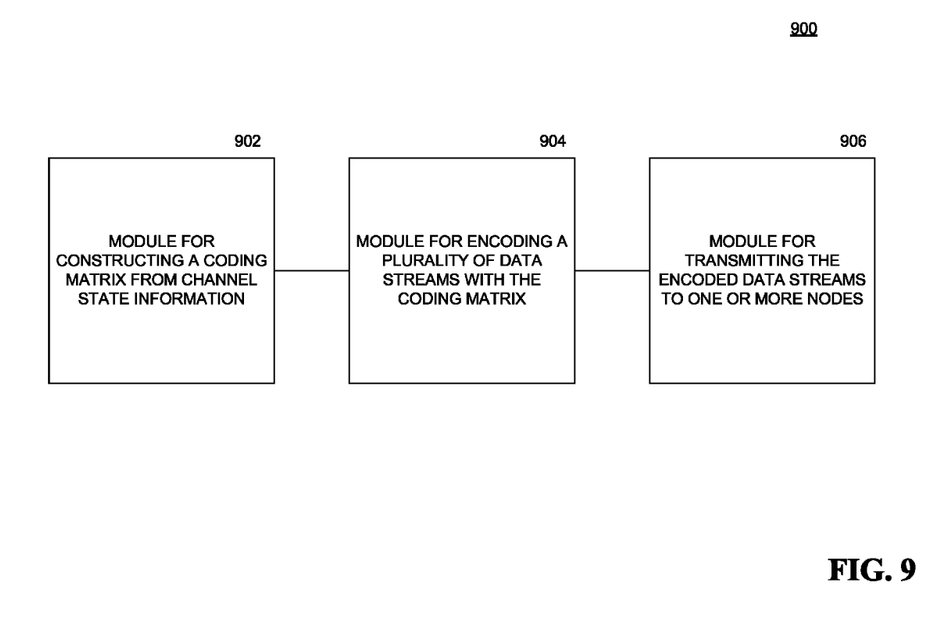
FIG. 9 is a block diagram illustrating the functionality of an apparatus for encoding data streams in accordance with one aspect of the disclosure.

FIG. 9 is a diagram illustrating the functionality of an apparatus 900 in accordance with one aspect of the disclosure. The apparatus 900 includes a module 902 for constructing a coding matrix from channel state information; a module 904 for encoding a plurality of data streams with the coding matrix; and a module 906 for transmitting the encoded data streams to one or more nodes.

Figure 10:
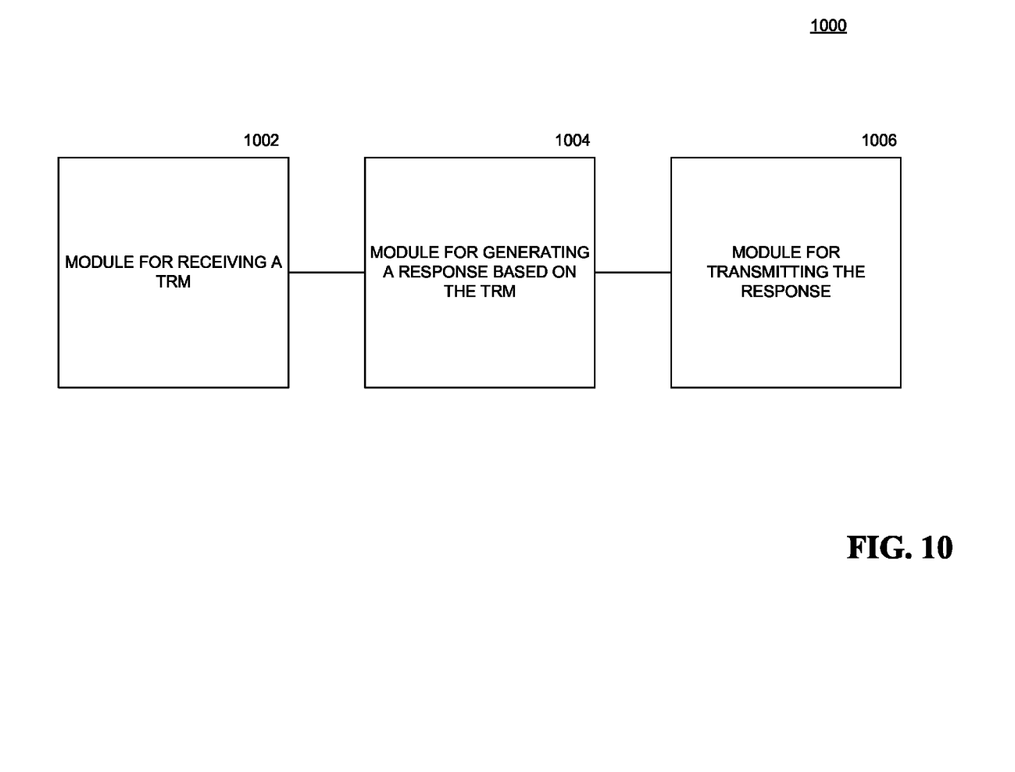
FIG. 10 is a block diagram illustrating the functionality of an apparatus for returning channel information in accordance with one aspect of the disclosure.

FIG. 10 is a diagram illustrating the functionality of an apparatus 1000 in accordance with one aspect of the disclosure. The apparatus 1000 includes a module 1002 for receiving a TRM; a module 1004 for generating a response based on the TRM; and a module 1006 for transmitting the response.

Those of skill will appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for wireless communications, comprising:
a processing system configured to:
construct a coding matrix from channel state information;
encode a plurality of data streams with the coding matrix; and
transmit the encoded data streams to one or more nodes, wherein the construction of the coding matrix comprises:
grouping the one or more nodes into a plurality of node subsets; and
creating a coding matrix for each node subset.

2. The apparatus of claim 1, wherein the transmission comprises:
transmitting at least one of the encoded data streams to a first node subset; and
transmitting at least one of the encoded data streams to a second node subset, wherein the transmissions are separated by a time period.

3. The apparatus of claim 1, wherein a node subset in the plurality of node subsets comprises a single node configured to communicate with the apparatus using beamforming.

4. The apparatus of claim 1, wherein the processing system is further configured to communicate with the one or more nodes to obtain the channel state information.

5. The apparatus of claim 4, wherein the communication comprises a Training Request Message (TRM).

6. The apparatus of claim 5, wherein the TRM is transmitted using a contention-based backoff procedure.

7. The apparatus of claim 4, wherein a portion of the communication is used to reserve the wireless medium for the one or more nodes to communicate with the apparatus.

8. The apparatus of claim 4, wherein the communication comprises:
receiving a sounding frame from each of the one or more nodes; and
estimating the channel state information for each of the one or more nodes from the sounding frames.

9. The apparatus of claim 4, wherein the processing system is further configured to generate a sounding frame to enable each of the one or more nodes to estimate channel state information for that node.

10. The apparatus of claim 4, wherein the processing system is further configured to receive the channel state information from each of the one or more nodes.

11. The apparatus of claim 1, wherein the transmission of the encoded data streams is preceded by a message to reserve the wireless medium to complete data transmission.

12. The apparatus of claim 1, wherein a portion of the transmission of the encoded data streams is used to reserve the wireless medium to complete the data stream transmission.

13. The apparatus of claim 1, wherein a portion of the data stream transmission is used to signal transmission of the data streams and a modulation and coding scheme (MCS) to the one or more nodes.

14. The apparatus of claim 1, wherein the processing system is further configured to receive an acknowledgement from each of the one or more nodes following the transmission of the data streams.

15. The apparatus of claim 14, wherein the acknowledgement from the one or more nodes are simultaneously received.

16. The apparatus of claim 14, wherein a portion of the data stream transmission further comprises a transmission schedule for the transmission of the acknowledgement from each of the one or more nodes following the data stream transmission.

17. The apparatus of claim 16, wherein the transmission schedule comprises at least one of time, space and frequency information for transmission of the acknowledgement from each of the one or more nodes.

18. The apparatus of claim 1, wherein the processing system is further configured to construct the coding matrix by also using an interference metric related to each of the one or more nodes.

19. An apparatus for wireless communications, comprising:
    means for constructing a coding matrix from channel state information;
    means for encoding a plurality of data streams with the coding matrix; and
    means for transmitting the encoded data streams to one or more nodes, wherein the means for constructing is configured to:
        group the one or more nodes into a plurality of node subsets; and
        create a coding matrix for each node subset.

20. The apparatus of claim 19, wherein the transmission means comprises:
    means for transmitting at least one of the encoded data streams to a first node subset; and
    means for transmitting at least one of the encoded data streams to a second node subset, wherein the transmissions are separated by a time period.

21. The apparatus of claim 19, wherein a node subset in the plurality of node subsets comprises a single node configured to communicate with the apparatus using beamforming.

22. The apparatus of claim 19, further comprising means for communicating with the one or more nodes to obtain the channel state information.

23. The apparatus of claim 22, wherein the communication means comprises means for transmitting a Training Request Message (TRM).

24. The apparatus of claim 23, wherein the TRM is transmitted using a contention-based backoff procedure.

25. The apparatus of claim 22, wherein a portion of the communication is used to reserve the wireless medium for the one or more nodes to communicate with the apparatus.

26. The apparatus of claim 22, wherein the communication means comprises:
    means for receiving a sounding frame from each of the one or more nodes; and
    means for estimating the channel state information for each of the one or more nodes from the sounding frames.

27. The apparatus of claim 22, further comprising means for generating a sounding frame to enable each of the one or more nodes to estimate channel state information for that node.

28. The apparatus of claim 22, further comprising means for receiving the channel state information from each of the one or more nodes.

29. The apparatus of claim 19, wherein the transmission of the encoded data streams is preceded by a message to reserve the wireless medium to complete data transmission.

30. The apparatus of claim 19, wherein a portion of the transmission of the encoded data streams is used to reserve the wireless medium to complete the data stream transmission.

31. The apparatus of claim 19, wherein a portion of the data stream transmission is used to signal transmission of the data streams and a modulation and coding scheme (MCS) to the one or more nodes.

32. The apparatus of claim 19, further comprising means for receiving an acknowledgement from each of the one or more nodes following the transmission of the data streams.

33. The apparatus of claim 32, wherein the acknowledgement from the one or more nodes are simultaneously received.

34. The apparatus of claim 32, wherein a portion of the data stream transmission further comprises a transmission schedule for the transmission of the acknowledgement from each of the one or more nodes following the data stream transmission.

35. The apparatus of claim 34, wherein the transmission schedule comprises at least one of time, space and frequency information for transmission of the acknowledgement from each of the one or more nodes.

36. The apparatus of claim 19, further comprising means for constructing the coding matrix by also using an interference metric related to each of the one or more nodes.

37. A method for wireless communications, comprising:
    constructing a coding matrix from channel state information;
    encoding a plurality of data streams with the coding matrix; and
    transmitting the encoded data streams to one or more nodes, wherein constructing the coding matrix comprises:
        grouping the one or more nodes into a plurality of node subsets; and
        creating a coding matrix for each node subset.

38. The method of claim 37, further comprising:
    transmitting at least one of the encoded data streams to a first node subset; and
    transmitting at least one of the encoded data streams to a second node subset, wherein the transmissions are separated by a time period.

39. The method of claim 37, wherein a node subset in the plurality of node subsets comprises a single node configured to communicate using beamforming.

40. The method of claim 37, further comprising communicating with the one or more nodes to obtain the channel state information.

41. The method of claim 40, further comprising transmitting a Training Request Message (TRM).

42. The method of claim 41, wherein the TRM is transmitted using a contention-based backoff procedure.

43. The method of claim 40, wherein a portion of the communication is used to reserve the wireless medium for the one or more nodes.

44. The method of claim 40, wherein the communication comprises:
    receiving a sounding frame from each of the one or more nodes; and
    estimating the channel state information for each of the one or more nodes from the sounding frames.

45. The method of claim 40, further comprising generating a sounding frame to enable each of the one or more nodes to estimate channel state information for that node.

46. The method of claim 40, further comprising receiving the channel state information from each of the one or more nodes.

47. The method of claim 37, wherein the transmission of the encoded data streams is preceded by a message to reserve the wireless medium to complete data transmission.

48. The method of claim 37, wherein a portion of the transmission of the encoded data streams is used to reserve the wireless medium to complete the data stream transmission.

49. The method of claim 37, wherein a portion of the data stream transmission is used to signal transmission of the data streams and a modulation and coding scheme (MCS) to the one or more nodes.

50. The method of claim 37, further comprising receiving an acknowledgement from each of the one or more nodes following the transmission of the data streams.

51. The method of claim 50, wherein the acknowledgement from the one or more nodes are simultaneously received.

52. The method of claim 50, wherein a portion of the data stream transmission further comprises a transmission schedule for the transmission of the acknowledgement from each of the one or more nodes following the data stream transmission.

53. The method of claim 52, wherein the transmission schedule comprises at least one of time, space and frequency information for transmission of the acknowledgement from each of the one or more nodes.

54. The method of claim 37, further comprising constructing the coding matrix by also using an interference metric related to each of the one or more nodes.

55. A computer-program product for communication, comprising:

a non-transitory machine-readable medium comprising instructions executable to:
 construct a coding matrix from channel state information; and
 encode a plurality of spatial streams with the coding matrix for transmission to one or more nodes, wherein constructing the coding matrix comprises:
  grouping the one or more nodes into a plurality of node subsets; and
  creating a coding matrix for each node subset.

56. An access point, comprising:
one or more antennas;
a processing system configured to construct a coding matrix from channel state information and encode a plurality of spatial streams with the coding matrix; and
a transmitter configured to transmit, via the one or more antennas, the encoded spatial streams to one or more nodes, wherein the processing system is configured to construct the coding matrix by:
 grouping the one or more nodes into a plurality of node subsets; and
 creating a coding matrix for each node subset.

57. An electronic card, comprising:
a processing system configured to construct a coding matrix from channel state information and encode a plurality of spatial streams with the coding matrix; and
a transmitter configured to transmit the encoded spatial streams through a plurality of antennas, wherein the processing system is configured to construct the coding matrix by:
 grouping one or more nodes into a plurality of node subsets; and
 creating a coding matrix for each node subset.

* * * * *